United States Patent
Huang et al.

(10) Patent No.: US 11,859,294 B2
(45) Date of Patent: Jan. 2, 2024

(54) W18O49/COO/NF SELF-SUPPORTING ELECTROCATALYTIC MATERIAL AND PREPARATION METHOD THEREOF

(71) Applicant: SHAANXI UNIVERSITY OF SCIENCE & TECHNOLOGY, Shaanxi (CN)

(72) Inventors: Jianfeng Huang, Xi'an (CN); Guojuan Hai, Xi'an (CN); Liyun Cao, Xi'an (CN); Liangliang Feng, Xi'an (CN)

(73) Assignee: SHAANXI UNIVERSITY OF SCIENCE & TECHNOLOGY, Shaanxi (CN)

( * ) Notice: Subject to any disclaimer, the term of this patent is extended or adjusted under 35 U.S.C. 154(b) by 335 days.

(21) Appl. No.: 17/451,133

(22) Filed: Oct. 15, 2021

(65) Prior Publication Data

US 2022/0127734 A1   Apr. 28, 2022

(30) Foreign Application Priority Data

Oct. 22, 2020   (CN) .......................... 202011139020.9

(51) Int. Cl.
| | |
|---|---|
| *C25B 11/052* | (2021.01) |
| *C25B 1/04* | (2021.01) |
| *C25B 11/091* | (2021.01) |
| *C25B 11/061* | (2021.01) |
| *C25B 11/031* | (2021.01) |
| *C23C 18/12* | (2006.01) |

(52) U.S. Cl.
CPC ........ *C25B 11/052* (2021.01); *C23C 18/1216* (2013.01); *C23C 18/1241* (2013.01); *C23C 18/1283* (2013.01); *C23C 18/1295* (2013.01); *C25B 1/04* (2013.01); *C25B 11/031* (2021.01); *C25B 11/061* (2021.01); *C25B 11/091* (2021.01)

(58) Field of Classification Search
CPC .... C25B 11/052; C25B 11/061; C25B 11/091
See application file for complete search history.

(56) References Cited

FOREIGN PATENT DOCUMENTS

| | | | | |
|---|---|---|---|---|
| CN | 109621854 A | * | 4/2019 | ............ B01J 13/043 |
| JP | 3723902 B2 | * | 12/2005 | .......... H01M 4/8605 |

OTHER PUBLICATIONS

JP3723902B2, machine translation. (Year: 2005).*
CN109621854A, Machine translation. (Year: 2019).*

(Continued)

*Primary Examiner* — Robert A Vetere
(74) *Attorney, Agent, or Firm* — Alleman Hall Creasman & Tuttle LLP

(57) ABSTRACT

The present disclosure relates to a $W_{18}O_{49}$/CoO/NF self-supporting electrocatalytic material and a preparation method thereof, the $W_{18}O_{49}$/CoO/NF self-supporting electrocatalytic material comprises: a foamed nickel substrate, and a $W_{18}O_{49}$/CoO composite nano material generated on the foamed nickel substrate in situ; preferably, wherein the $W_{18}O_{49}$/CoO composite nano material comprises CoO nanosheets attached directly to the foamed nickel substrate, and $W_{18}O_{49}$ nanowires attached to the nanosheets.

12 Claims, 5 Drawing Sheets

(56) References Cited

OTHER PUBLICATIONS

Karim et al., "Novel heat-treated cobalt phthalocyanine/carbon-tungsten oxide nanowires (CoPc/C—W18O49) cathode catalyst for direct methanol fuel cell," 2017, Journal of Electroanalytical Chemistry, pp. 19-29 (Year: 2017).*

* cited by examiner

$W_{18}O_{49}$/COO/NF SELF-SUPPORTING ELECTROCATALYTIC MATERIAL AND PREPARATION METHOD THEREOF

TECHNICAL FIELD

The present disclosure relates to a $W_{18}O_{49}$/CoO/NF self-supporting electrocatalytic material and a preparation method thereof, which belongs to the technical field of composite materials.

BACKGROUND

With the increasing consumption speed of fossil fuels in industrial production, carbon dioxide and other greenhouse gases are released rapidly, so that the global temperature eventually rises, and a series of natural disasters are caused. Fossil fuels are an energy source which must be consumed for the development of human society, and therefore an increase in the consumption of fossil fuels is inevitable. At the same time, fossil fuels are a non-renewable energy source in the short term, their reserves are limited, and their reserves are gradually reduced by continuous and rapid consumption. Therefore, research on new sustainable clean energy to replace non-renewable fossil fuel energy is a problem that must be solved in the development of current society. As a new type of chemical energy carrier that is easy to store and transform, hydrogen has many advantages such as cleanliness, zero carbon emissions, and environmental friendliness. The electrochemical electrolysis of water has been recognized as one of the most promising renewable energy conversion technologies for sustainable and clean energy. The electrolysis process of water includes two half reactions: oxygen evolution reactions (OER) and hydrogen evolution reactions (HER). These two processes are critical to the overall efficiency of water splitting. At present, noble metal Pt-based materials are considered to be the most effective HER electrocatalysts, and Ir/Ru and its oxides are considered to exhibit excellent OER electrocatalytic properties in both acidic and alkaline electrolytes. However, since these noble metal materials are contained in the earth crust in a small amount and have high costs, their commercial mass application is limited. In order to overcome these shortcomings, researchers have been working to develop new, cost effective, and sustainable non-noble metal electrocatalytic materials in recent years.

The monoclinic system $W_{18}O_{49}$ with a large number of surface oxygen vacancies has attracted wide attention in applications such as electrochemistry. Oxygen defects in metal oxides as active sites can improve conductivity and facilitate the adsorption and desorption of water molecules or intermediate reactive substances (for example, ·H in HER; ·OH and ·OOH in OER). However, the theoretical overpotential of the structurally stable $W_{18}O_{49}$ (relative to the reversible hydrogen electrode (RHE)) is relatively large (greater than 0.50 eV), which means that the hydrogen evolution reaction is more difficult. Therefore, the electronic structure of $W_{18}O_{49}$ is adjusted by doping, compounding, and other technological means to increase the content of unsaturated low-valence W ions in the crystal structure of $W_{18}O_{49}$ and to increase the oxygen vacancies, and the electrocatalytic activity is favorably improved. In addition, there are relatively few studies on non-stoichiometric $W_{18}O_{49}$ as a bifunctional electrocatalytic material, and its oxygen and hydrogen production performance needs to be studied further. In addition, in order to avoid the influence of the binder on the conductivity and active area of the catalyst during the preparation of the working electrode, the direct synthesis of the $W_{18}O_{49}$ nanostructured catalyst on the conductive substrate can effectively improve the electrocatalytic performance. Foamed nickel with high abundance and low price has attracted widespread attention as a support system for materials due to its large specific surface area, high electronic conductivity, and ideal 3D open-cell structure.

Cobalt-based oxide has the advantages of abundant material sources, low price, and environmental friendliness, etc. Cobalt (Co) belongs to the fourth period and VIII groups of the periodic table of elements. The common valence states include +2 and +3 valence, and its chemical property is relatively stable. Current studies have shown that cobalt oxides exhibit better catalytic performance in the aspects of oxygen reduction reactions (ORR) and OER, are widely used as dual-functional catalysts, and have good application prospects in the field of catalysis.

SUMMARY

In view of the above-mentioned problems, the purpose of the present invention is to provide a high-efficiency dual-function $W_{18}O_{49}$/CoO/NF self-supporting electrocatalytic material and a preparation method thereof. The prepared and synthesized $W_{18}O_{49}$/CoO/NF self-supporting electrocatalytic material has a controllable structure, and the product $W_{18}O_{49}$/CoO/NF in alkaline solution shows better electrocatalytic performance than single-phase CoO/NF and $W_{18}O_{49}$/NF by compounding $W_{18049}$ and CoO.

In one aspect, the present invention provides a $W_{18}O_{49}$/CoO/NF self-supporting electrocatalytic material. The $W_{18}O_{49}$/CoO/NF self-supporting electrocatalytic material comprises: a foamed nickel substrate, and a $W_{18}O_{49}$/CoO composite nano material generated on the foamed nickel substrate in situ. Preferably, the $W_{18}O_{49}$/CoO composite nano material comprises CoO nanosheets attached directly to the foamed nickel substrate, and $W_{18}O_{49}$ nanowires attached to the nanosheets.

In the present disclosure, $W_{18}O_{49}$ rich in oxygen defects and CoO are compounded for the first time and grow directly on the foamed nickel substrate through a one-step method, thereby not only avoiding the influence of the adhesive on the conductivity and activity of the catalyst during the preparation of the working electrode, but also effectively improving the electrocatalytic performance. When the $W_{18}O_{49}$ nanowires are tightly attached to the CoO nanosheets, the electron transport distance between $W_{18}O_{49}$ and CoO can be shortened, so that the electron transfer in the electrocatalytic process is facilitated, and the rapid generation of oxygen and hydrogen is promoted.

Preferably, the total loading capacity of the $W_{18}O_{49}$/CoO composite nano material on the foamed nickel substrate is 0.5 to 3.5 mg/cm². If the loading capacity is too little, the loading amount of the product on the foamed nickel is small, and the catalytic ability is reduced; If the loading capacity is too much, the product easily falls off from the foamed nickel during the electrocatalytic process, which affects the electrocatalytic stability. Therefore, too much or too little loading is not conducive to the improvement in catalytic performance in the electrocatalytic process.

Preferably, the molar ratio of $W_{18}O_{49}$ to CoO in the $W_{18}O_{49}$/CoO composite nanomaterial is (0.005 to 0.27):1, more preferably it is (0.06 to 0.25):1.

According to the present disclosure, the foamed nickel with a precursor of $W_{18}O_{49}$/CoO is obtained by a solvothermal method, and then the precursor is subjected to solid-phase sintering in a nitrogen atmosphere at 200 to 400° C. to synthesize $W_{18}O_{49}$/CoO composite material composed of CoO and $W_{18}O_{49}$. The material comprises CoO nanosheets directly attached to the foamed nickel substrate, and $W_{18}O_{49}$ nanowires attached to the nanosheets. In a preferred embodiment, the thickness of the CoO nanosheets is less than or equal to 100 nm, the diameter of the $W_{18}O_{49}$ nanowires is 5 to 10 nm, and the length of the $W_{18}O_{49}$ nanowires is 100 to 200 nm. In addition, in another preferred solution, the morphology of the $W_{18}O_{49}$/CoO composite nanomaterial grown on foamed nickel is a three-dimensional self-assembled flower-like structure.

In another aspect, the present disclosure also provides a preparation method of the above-mentioned $W_{18}O_{49}$/CoO/NF self-supporting electrocatalytic material comprising:

(1) draining a first solution containing a cobalt source into a second solution containing a tungsten source during a stirring process to obtain a third solution;

(2) putting the foamed nickel into a high-pressure reaction kettle containing the third solution, reacting at 120 to 220° C. for 1 to 36 hours, and then washing and drying to obtain the foamed nickel grown with the precursor of $W_{18}O_{49}$/CoO; and (3) calcining the foamed nickel grown with the precursor of $W_{18}O_{49}$/CoO in a nitrogen atmosphere at 200 to 400° C. to obtain the $W_{18}O_{49}$/CoO/NF self-supporting electrocatalytic material.

Preferably, the tungsten source is selected from at least one of ammonium paratungstate, ammonium paratungstate hexahydrate $(NH_4)_6W_7O_{24}·6H_2O$, ammonium paratungstate tetrahydrate $(NH_4)_{10}[H_2W_{12}O_{42}]·4H_2O$, metatungstic acid ammonium $(NH_4)_6H_2W_{12}O_{40}·XH_2O$, tungsten isopropoxide $W(OCH(CH_3)_2)_6$, and tungsten hexachloride $WCl_6$; the cobalt source is selected from at least one of cobalt chloride hexahydrate $CoCl_2·6H_2O$, cobalt chloride $CoCl_2$, hexaamino cobalt chloride $[Co(NH_3)_6]Cl_3$, cobalt acetate $(CH_3CO_2)_2Co$ and cobalt acetate tetrahydrate $C_4H_6CoO_4·4H_2O$.

Preferably, solvents of the first solution containing the cobalt source and the second solution containing the tungsten source are respectively selected from one of a mixed solution of isopropanol, absolute ethanol, isopropanol, and a mixed solvent of anhydrous ethanol, anhydrous ethanol and ethylene glycol, a mixed solvent of anhydrous ethanol and glycerol, a mixed solvent of isopropanol and ethylene glycol, and a mixed solvent of isopropanol and glycerol. When the tungsten source is dissolved in the above-mentioned alcohol solvent, alcoholysis will occur at room temperature to form a tungsten alkoxide solution during which part of the high-valence tungsten will be converted into low-valence tungsten. Furthermore, the conversion of low-valency tungsten is further promoted in the subsequent solvothermal reaction process, and non-stoichiometric tungsten oxide $W_{18}O_{49}$ is generated.

Preferably, the molar ratio of the tungsten source to the cobalt source is (0.05 to 5):1, more preferably (1 to 3.5):1. When the tungsten source or the cobalt source is too small, to the synthesis of the product is not facilitated, the phase of the product is changed, the single phase is easily synthesized, and the formation of a composite phase on the foamed nickel is not facilitated. At the same time, the product grows with difficulty or grows sparsely on the foamed nickel, and therefore the electrocatalytic performance is influenced.

Preferably, the volume filling ratio of the high-pressure reaction kettle containing the solution C is 20 to 70%.

Preferably, the calcination time is 1 to 3 hours, and the heating rate of the calcination is 2 to 5° C./min.

Beneficial effects:

(1) The present disclosure synthesizes the $W_{18}O_{49}$/CoO composite material composed of CoO and $W_{18}O_{49}$ by the solvothermal method and solid phase sintering method, and the composite material directly grows on the foamed nickel substrate;

(2) the method has the advantages of mild reaction conditions, easy realization, simple preparation process, low cost, easily controlled process, and environmental friendliness;

(3) by controlling the content of each precursor, the content of additives, reaction temperature, reaction time, etc., the morphology of the product can be well regulated (such as obtaining a $W_{18}O_{49}$/CoO composite material with nanowires, flakes, self-assembled three-dimensional structure);

(4) The $W_{18}O_{49}$/CoO/NF electrocatalytic material prepared by the present disclosure exhibits better electrocatalytic hydrogen production and oxygen production performance in alkaline electrolyte.

DETAILED DESCRIPTION

Figure 1:
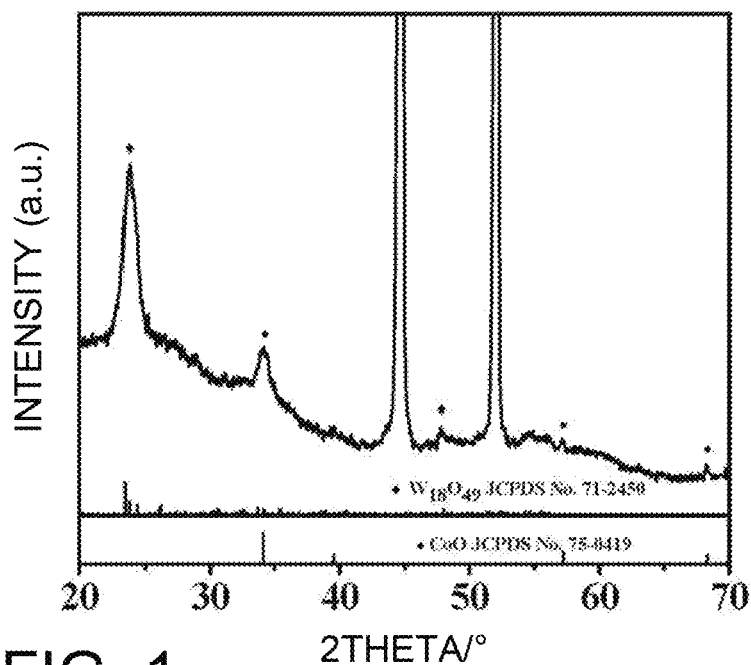
FIG. 1 shows an X-ray diffraction (XRD) pattern of the $W_{18}O_{49}$/CoO/NF self-supporting electrocatalytic material prepared in Example 1.

The present disclosure will be further described below through the following embodiments. It should be understood that the following embodiments are only used to illustrate the present disclosure, not to limit the present disclosure.

In the present disclosure, a solvothermal method and solid phase sintering method are used to synthesize a $W_{18}O_{49}$/CoO composite material on the foamed nickel substrate in situ, and a high-efficiency dual-function $W_{18}O_{49}$/CoO/NF self-supporting electrocatalytic material is obtained. The following exemplarily describes the preparation method of the $W_{18}O_{49}$/CoO/NF self-supporting electrocatalytic material provided by the present disclosure.

Cleaning of Foamed Nickel Substrates

For example, take a beaker and completely immerse the nickel foam with the length-width ratio of (1 to 7): 1 in acetone, HCl solution of 3 to 6 mol/L, deionized water, and absolute ethanol in sequence, and take ultrasonic treatment for 15 to 30 minutes respectively.

The tungsten source is dissolved in the solvent to obtain a solution A containing the tungsten source (solution A for short). Among them, the tungsten source can be ammonium paratungstate $(NH_4)_{10}[H_2W_{12}O_{42}]\cdot xH_2O$ (such as: ammonium paratungstate hexahydrate $(NH_4)_6W_7O_{24}\cdot 6H_2O$, ammonium paratungstate tetrahydrate $(NH_4)_{10}[H_2W_{12}O_{42}]\cdot 4H_2O$ ammonium metatungstate $(NH_4)_6H_2W_{12}O_{40}\cdot yH_2O$, tungsten isopropoxide $W(OCH(CH_3)_2)_6$ and tungsten hexachloride $WCl_6$, etc. The solvent can be at least one of a mixed solution of isopropanol, absolute ethanol, isopropanol, and a mixed solvent of anhydrous ethanol, anhydrous ethanol and ethylene glycol, and a mixed solvent of anhydrous ethanol and glycerol, and a mixed solvent of isopropanol and ethylene glycol, and a mixed solvent of isopropanol and glycerol. When a mixed solvent is selected as the solvent, the volume ratio of the mixed solvent is (0.5 to 3):1. The concentration of the tungsten source in solution A can be 0.01 to 5 mol/L. For example, add tungsten hexachloride ($WCl_6$) to a mixed solvent of isopropanol and absolute ethanol, and stir it for 20 to 60 minutes to form a uniformly mixed solution A. Alcohol is selected to replace water to be used as a solvent for dissolving, so that an alcoholization reaction occurs during the stirring process of the tungsten source at room temperature, the conversion from high-valence tungsten to low-valence tungsten is facilitated, and the rapid formation of non-stoichiometric tungsten oxide in the solvothermal process is facilitated. In addition, within this concentration range, composite products with different microscopic morphologies and different electrocatalytic properties can be prepared by selecting a suitable tungsten source and solvent type, and the product can grow well on the foamed nickel and cannot fall off.

The cobalt source is dissolved in the solvent to obtain a solution B containing the cobalt source (solution B for short). Among them, the cobalt source can be at least one of cobalt chloride hexahydrate $CoCl_2\cdot 6H_2O$, cobalt chloride $CoCl_2$, hexaamino cobalt chloride $[Co(NH_3)_6]Cl_3$, cobalt acetate $(CH_3CO_2)_2Co$ and cobalt acetate tetrahydrate $C_4H_6CoO_4\cdot 4H_2O$. The solvent can be at least one of the mixed solution of isopropanol, absolute ethanol, isopropanol, and the mixed solvent of anhydrous ethanol, anhydrous ethanol and ethylene glycol, and the mixed solvent of anhydrous ethanol and glycerol, and the mixed solvent of isopropanol and ethylene glycol, and the mixed solvent of isopropanol and glycerol. When a mixed solvent is selected as the solvent, the volume ratio of the mixed solvent is (0.5 to 3):1. The concentration of the cobalt source in solution B can be 0.01 to 5 mol/L. For example, add cobalt chloride hexahydrate ($CoCl_2\cdot 6H_2O$) to a mixed solvent of isopropanol and absolute ethanol, and stir it for 20 to 60 minutes to form a uniformly mixed solution B. Too high or too low a concentration of the cobalt source is not beneficial to the synthesis of cobalt oxide. In addition, within this concentration range, composite products with different microscopic morphologies and different electrocatalytic properties can be prepared by selecting a proper cobalt source and a proper solvent type, and the product can grow well on the foamed nickel and cannot fall off.

Drain the solution B into the solution A under the action of stirring, and uniformly mixed to obtain a solution C. The molar ratio of the tungsten source and the cobalt source can be (0.05 to 5):1. The stirring action can be magnetic stirring or the like. As an example, the solution B containing cobalt chloride hexahydrate is drained into the solution A containing tungsten hexachloride under the action of magnetic stirring, and the magnetic stirring is continued for 20 to 60 minutes to obtain a uniformly mixed solution C. The molar ratio of tungsten hexachloride ($WCl_6$) and cobalt chloride hexahydrate ($CoCl_2\cdot 6H_2O$) is (0.05 to 5):1. When the tungsten source or the cobalt source is excessive, the synthesis of the product is not beneficial, so that the product is difficult to grow or grows sparsely on the foamed nickel, and the electrocatalytic performance is finally deteriorated, and the product directly falls off during the catalysis process.

Pour the uniformly mixed solution C into a polytetrafluoroethylene lined autoclave, and maintain the volume filling ratio at 20 to 70%.

Put the foamed nickel substrate or the cleaned foamed nickel substrate into a polytetrafluoroethylene-lined autoclave containing the solution C and seal it.

Put the sealed reaction kettle into a homogeneous hydrothermal reactor for reaction to obtain foamed nickel with a precursor of $W_{18}O_{49}$/CoO. The temperature set for the reaction can be 120 to 220° C., and the reaction time can be 1 to 36 hours. If the reaction temperature is too low or time is too short, the crystallinity of the product will be poor; if the temperature is too high or the time is too long, non-stoichiometric tungsten oxide is easily oxidized.

After the reaction is completed, the temperature is cooled to room temperature, and the nickel foam with the grown precursor of $W_{18}O_{49}$/CoO is washed and dried. Washing can be respectively carried out 3 to 5 times by using absolute ethanol and deionized water. Drying can be drying the mixture in a vacuum oven at 30 to 70° C. for 3 to 10 hours, or drying the mixture in a freeze drying oven at −40 to −60° C. for 3 to 10 hours.

The foamed nickel with the precursor of $W_{18}O_{49}$/CoO is put into a porcelain boat and calcined in nitrogen atmosphere to prevent the oxidation of non-chemical tungsten oxide. At the same time, the precursor is easier to produce oxygen defects during the calcination process, and these defect sites can be used as active sites of the electrocatalytic material to improve the catalytic activity of the material. The calcination temperature can be 200 to 400° C., and the calcination time can be 1 to 3 hours. Preferably, the heating rate of calcination may be 2 to 5° C./min. Too low calcination temperature or reaction time can make the reaction kinetic energy insufficient, and the organic residue on the composite material is difficult to remove, thereby being not beneficial to improve the electrocatalytic performance. Too high of a calcination temperature or too long of an amount of time may embrittle the foamed nickel and prevent the self-supporting function of the electrode.

In the present disclosure, the obtained $W_{18}O_{49}$/CoO/NF self-supporting electrocatalytic material has a variety of microscopic morphologies, such as nanowires, nanosheets, and self-assembled nanoflower-like structures.

In an optional embodiment, the loading amount of CoO/$W_{18}O_{49}$ on the nickel foam calculated by the ICP test may be 0.5 to 3.5 mg/cm$^2$.

In an alternative embodiment, the molar ratio of $W_{18}O_{49}$ and CoO may be (0.005 to 0.27): 1.

Hereinafter, the present disclosure will be further described with the following examples. It should be understood that the following examples are used to explain this invention and do not mean to limit the scope of this invention. Any non-essential improvements and modifications made by a person skilled in the art based on this invention all fall into the protection scope of this invention. The specific process parameters below are only exemplary, and a person skilled in the art can choose proper values within an appropriate range according to the description, and are not restricted to the specific values shown below.

Example 1

1) A solution A with a concentration of 0.45 mol/L of analytical reagent tungsten hexachloride ($WCl_6$) and a solution B with a concentration of 0.45 mol/L cobalt chloride hexahydrate ($CoCl_2.6H_2O$) were prepared. Tungsten hexachloride ($WCl_6$) was added into 20 mL of absolute ethanol solvent and stirring for 30 minutes to form a uniformly mixed solution A;

2) Cobalt chloride hexahydrate ($CoCl_2.6H_2O$) was added to 20 mL of absolute ethanol solvent and stirred for 30 minutes to form a uniformly mixed solution B. The solution B was drained into the solution A under the action of magnetic stirring, and magnetic stirring was continued for 30 minutes to obtain a uniformly mixed solution C. The molar ratio of tungsten hexachloride to cobalt chloride hexahydrate was 1:1;

3) The uniformly mixed solution C was poured into a polytetrafluoroethylene lined autoclave, and the volume filling ratio was maintained at 40%;

4) In a 50 mL beaker, the nickel foam was completely immersed with a length of 6 cm and a width of 1 cm in acetone, a 3 mol/L HCl solution, deionized water, and absolute ethanol in sequence, and ultrasonic treatment was carried out for 30 minutes respectively. The processed nickel foam was put into a polytetrafluoroethylene reactor containing the solution C;

5) The sealed reaction kettle was put into a homogeneous hydrothermal reactor, the temperature parameter was set to 150° C., and the reaction time was set to 20 hours;

6) After the reaction was finished, the reaction solution was cooled to room temperature, and the nickel foam on which the precursor of $W_{18}O_{49}$/CoO grew was washed by absolute ethanol and deionized water 5 times respectively. Then, it was dried in a vacuum oven or freeze drying oven at 60° C. for 4 hours;

7) The nickel foam with the grown precursor of $W_{18}O_{49}$/CoO was put into a porcelain boat, and calcined in a nitrogen atmosphere at the calcination temperature of 250° C. for 2 hours at the heating rate of 2° C./min to obtain $W_{18}O_{49}$/CoO/NF self-supporting electrocatalytic material. The loading amount of $W_{18}O_{49}$/CoO in the obtained $W_{18}O_{49}$/CoO/NF self-supporting electrocatalytic material was 1.5 mg/cm². The molar ratio of $W_{18}O_{49}$ to CoO in the $W_{18}O_{49}$/CoO/NF self-supporting electrocatalytic material was 0.06:1.

Example 2

1) A solution A with a solubility of 0.08 mol/L of analytical reagent tungsten hexachloride ($WCl_6$) and a solution B with a concentration of 0.04 mol/L cobalt acetate (($CH_3CO_2)_2Co$) were prepared. Tungsten hexachloride ($WCl_6$) was added into a mixed solvent of 10 mL of isopropanol and 20 mL of absolute ethanol, and stirred for 30 minutes to form a uniformly mixed solution A;

2) Cobalt acetate (($CH_3CO_2)_2Co$) was added to a mixed solvent of 10 mL of isopropanol and 20 mL of absolute ethanol, and stirred for 30 minutes to form a uniformly mixed solution B. The solution B was drained into the solution A under the action of magnetic stirring, and magnetic stirring was continued for 40 minutes to obtain a uniformly mixed solution C. The molar ratio of tungsten hexachloride to cobalt acetate was 2:1;

3) The uniformly mixed solution C was poured into a polytetrafluoroethylene lined autoclave, and the volume filling ratio was maintained at 60%;

4) In a 50 mL beaker, the foamed nickel was completely immersed with a length of 4 cm and a width of 1 cm in acetone, a 4 mol/L HCl solution, deionized water, and absolute ethanol in sequence, and ultrasonic treatment was carried out for 15 minutes respectively. The processed foamed nickel was put into a polytetrafluoroethylene reactor containing the solution C;

5) The sealed reaction kettle was put into a homogeneous hydrothermal reactor, the temperature parameter was set to 180° C., and the reaction time was set to 12 hours;

6) After the reaction was finished, the reaction solution was cooled to room temperature, the nickel foam on which the precursor of $W_{18}O_{49}$/CoO grew was centrifuged and washed by absolute ethanol and deionized water 3 times respectively. The centrifuged material was dried in a vacuum oven or freeze drying oven to dry at 40° C. for 8 hours;

7) The nickel foam with the grown precursor of $W_{18}O_{49}$/CoO was put into a porcelain boat and calcined in a nitrogen atmosphere at the calcination temperature of 300° C. for 2 hours at the heating rate of 3° C./min to obtain $W_{18}O_{49}$/CoO/NF self-supporting electrocatalytic material. The loading amount of $W_{18}O_{49}$/CoO in the obtained $W_{18}O_{49}$/CoO/NF self-supporting electrocatalytic material was 0.5 mg/cm². The molar ratio of $W_{18}O_{49}$ to CoO in the $W_{18}O_{49}$/CoO/NF self-supporting electrocatalytic material was 0.1:1.

Example 3

1) A solution A with a concentration of 3 mol/L of analytical reagent tungsten isopropoxide ($W(OCH(CH_3)_2)_6$) and a solution B with a concentration of 1 mol/L cobalt chloride hexahydrate ($CoCl_2.6H_2O$) were prepared. Tungsten isopropoxide was added into a mixed solvent of 30 mL isopropanol and 10 mL anhydrous ethanol, where the volume ratio of isopropanol to anhydrous ethanol was 3:1, and stirred for 35 minutes to form a uniformly mixed solution A;

2) Cobalt chloride hexahydrate ($CoCl_2.6H_2O$) was added to a mixed solvent of 30 mL of isopropanol and 10 mL of absolute ethanol, where the volume ratio of isopropanol and absolute ethanol was 3:1, and stirred for 35 minutes to form a uniformly mixed solvent Solution B. The solution B was drained into the solution A under the action of magnetic stirring, and magnetic stirring was continued for 35 minutes to obtain a uniformly mixed solution C. The molar ratio of tungsten isopropoxide to cobalt chloride hexahydrate was 3:1;

3) The uniformly mixed solution C was poured into a polytetrafluoroethylene lined autoclave, and the volume filling ratio was maintained at 40%;

4) In a 50 mL beaker, the nickel foam was completely immersed with a length of 6 cm and a width of 2 cm in acetone, a 5 mol/L HCl solution, deionized water, and absolute ethanol in sequence, and ultrasonic treatment was carried out for 15 minutes respectively. The processed nickel foam was put into a polytetrafluoroethylene reactor containing the solution C;

5) The sealed reaction kettle was put into a homogeneous hydrothermal reactor, the temperature parameter was set to 120° C., and the reaction time was set to 36 hours;

6) After the reaction was finished, the reaction solution was cooled to room temperature, the nickel foam on which the precursor of $W_{18}O_{49}$/CoO grew was centrifuged and washed by absolute ethanol and deionized water 4 times. The centrifuged material was dried in a vacuum oven or freeze drying oven to dry at 70° C. for 3 hours;

7) The nickel foam with the grown precursor of $W_{18}O_{49}$/CoO was put into a porcelain boat, and calcined in a nitrogen atmosphere at the calcination temperature of 400° C. for 1 hour at the heating rate of 2° C./min to obtain $W_{18}O_{49}$/CoO/NF self-supporting electrocatalytic material. The loading amount of $W_{18}O_{49}$/CoO in the obtained $W_{18}O_{49}$/CoO/NF self-supporting electrocatalytic material was 2.6 mg/cm$^2$. The molar ratio of $W_{18}O_{49}$ to CoO in the $W_{18}O_{49}$/CoO/NF self-supporting electrocatalytic material was 0.15:1.

Example 4

1) A solution A with a concentration of 4 mol/L of analytical reagent ammonium paratungstate hexahydrate (($NH_4)_6W_7O_{24}\cdot 6H_2O$) and a solution B with a concentration of 1 mol/L cobalt chloride hexahydrate ($CoCl_2\cdot 6H_2O$) were prepared. $(NH_4)_6W_7O_{24}\cdot 6H_2O$ was added into a mixed solvent of 30 mL of isopropanol and 15 mL of absolute ethanol, where the volume ratio of isopropanol to absolute ethanol was 2:1, and stirred for 60 minutes to form a uniformly mixed solution A;

2) Cobalt chloride hexahydrate ($CoCl_2\cdot 6H_2O$) was added to a mixed solvent of 30 mL isopropanol and 15 mL absolute ethanol, where the volume ratio of isopropanol and absolute ethanol was 2:1, and stirred for 60 minutes to form a uniformly mixed solvent solution B. The solution B was drained into the solution A under the action of magnetic stirring, and magnetic stirring continued for 60 minutes to obtain a uniformly mixed solution C. The molar ratio of ammonium paratungstate hexahydrate to cobalt chloride hexahydrate was 4:1;

3) The uniformly mixed solution C was poured into a polytetrafluoroethylene lined autoclave, and the volume filling ratio was maintained at 60%;

4) In a 50 mL beaker, the nickel foam was completely immersed with a length of 6 cm and a width of 1 cm in acetone, a 3 mol/L HCl solution, deionized water, and absolute ethanol in sequence, and ultrasonic treatment was carried out for 20 minutes respectively. The processed nickel foam was put into a polytetrafluoroethylene reactor containing the solution C;

5) The sealed reaction kettle was put into a homogeneous hydrothermal reactor, the temperature parameter was set to 200° C., and the reaction time was set to 16 hours;

6) After the reaction was finished, the reaction solution was cooled to room temperature, the nickel foam on which the precursor of $W_{18}O_{49}$/CoO grew was centrifuged and washed by absolute ethanol and deionized water 5 times respectively. The centrifuged material was dried in a vacuum oven or freeze drying oven at 70° C. for 3 hours;

7) The foamed nickel with the grown precursor of $W_{18}O_{49}$/CoO was put into a porcelain boat, and calcined in a nitrogen atmosphere at the calcination temperature of 350° C. for 2 hours at the heating rate of 4° C./min to obtain $W_{18}O_{49}$/CoO/NF self-supporting electrocatalytic material. The loading amount of $W_{18}O_{49}$/CoO in the obtained $W_{18}O_{49}$/CoO/NF self-supporting electrocatalytic material was 3 mg/cm$^2$. The molar ratio of $W_{18}O_{49}$ to CoO in the $W_{18}O_{49}$/CoO/NF self-supporting electrocatalytic material was 0.2:1.

Example 5

For the preparation process of the self-supporting electrocatalytic material in this Example 5, refer to Example 1. The difference is that the molar ratio of tungsten hexachloride and cobalt chloride hexahydrate was 0.1:1. The loading amount of $W_{18}O_{49}$/CoO in the obtained $W_{18}O_{49}$/CoO/NF self-supporting electrocatalytic material was 0.53 mg/cm$^2$. The molar ratio of $W_{18}O_{49}$ to CoO in the $W_{18}O_{49}$/CoO/NF self-supporting electrocatalytic material was 0.005:1.

Example 6

For the preparation process of the self-supporting electrocatalytic material in this Example 6, refer to Example 1. The difference is that the molar ratio of tungsten hexachloride and cobalt chloride hexahydrate was 5:1. The loading amount of $W_{18}O_{49}$/CoO in the obtained $W_{18}O_{49}$/CoO/NF self-supporting electrocatalytic material was 3.2 mg/cm$^2$. The molar ratio of $W_{18}O_{49}$ to CoO in the $W_{18}O_{49}$/CoO/NF self-supporting electrocatalytic material was 0.27:1.

Comparative Example 1

For the preparation process of the self-supporting electrocatalytic material in this Comparative Example 1, refer to Example 1. The difference is that no analytical reagent tungsten hexachloride ($WCl_6$) was added. The obtained self-supporting electrocatalytic material was denoted as CoO/NF-1, and the loading amount of CoO was 0.3 mg/cm$^2$.

Comparative Example 2

For the preparation process of the self-supporting electrocatalytic material in this Comparative Example 2, refer to Example 1. The difference is that no cobalt chloride hexahydrate ($CoCl_2\cdot 6H_2O$) was added. The obtained self-supporting electrocatalytic material was denoted as $W_{18}O_{49}$/NF-1, and the loading amount of $W_{18}O_{49}$ was 0.35 mg/cm$^2$.

The NF (pure nickel foam), the self-supporting electrocatalytic materials obtained in Examples 1 to 6 and Comparative Examples 1 to 2 were respectively placed in 1M KOH alkaline electrolyte to perform hydrogen production electrocatalytic testing. The performance of electrocatalysis hydrogen and oxygen production performance adopts CHI660B electrochemical workstation of Shanghai Chenhua Instrument Co., Ltd. to collect data, and a three-electrode system, saturated calomel electrode (saturated KCl filling) as the reference electrode, and carbon rod as counter electrode, the self-supporting electrocatalysts were used as working electrodes. KOH of 1M was used as the electrolyte. The sweep rate of a linear voltammetric sweep curve (LSV) was 2 mV/s. $W_{18}O_{49}$/NF-1 was a $W_{18}O_{49}$/NF self-supporting electrocatalytic material prepared without adding cobalt chloride hexahydrate ($CoCl_2\cdot 6H_2O$) in Comparative Example 2; CoO/NF-1 was a CoO/NF self-supporting electrocatalytic material prepared without adding tungsten hexachloride ($WCl_6$) in Comparative Example 1; $W_{18}O_{49}$/CoO/NF-1 was a nanowire-attached $W_{18}O_{49}$/CoO/NF self-supporting electrocatalytic material of the nano-sheet structure prepared in Example 1. $W_{18}O_{49}$/CoO/NF-2 was the nano-needle-shaped $W_{18}O_{49}$/CoO/NF self-supporting electrocatalytic material prepared in Example 2; $W_{18}O_{49}$/CoO/NF-3 was a CoO nanosheet directly attached to the foamed nickel substrate, and a flower-shaped $W_{18}O_{49}$/NF self-supporting electrocatalytic material prepared in Example 3, which was assembled by $W_{18}O_{49}$ nanowires attached to the nanosheets; $W_{18}O_{49}$/CoO/NF-4 was the nanosheet-like $W_{18}O_{49}$/CoO/NF self-supporting electrocatalytic materials prepared in Example 4, and the nanosheets were $W_{18}O_{49}$/CoO composite materials.

Figure 8:
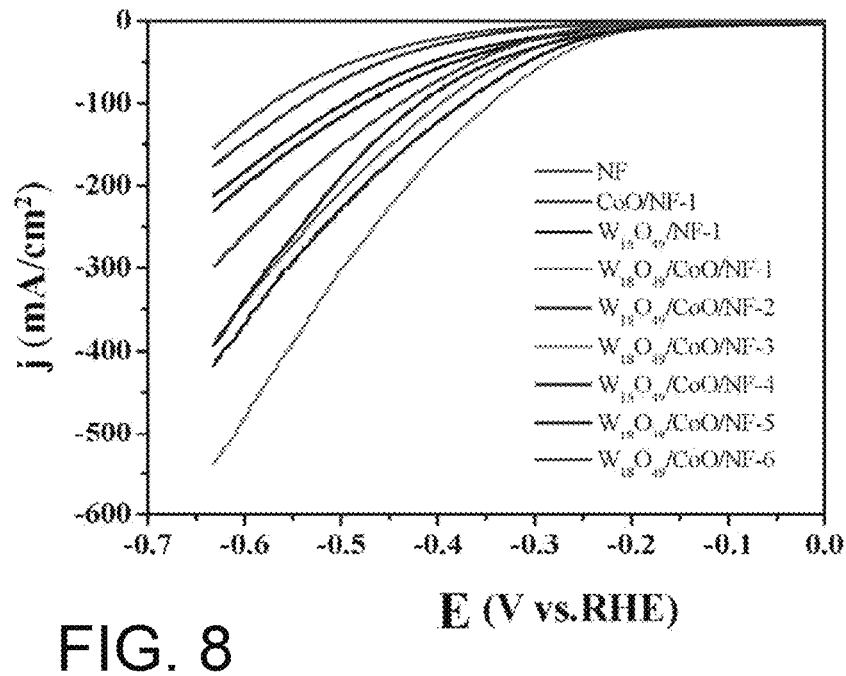
FIG. 8 shows the electrocatalytic hydrogen production performance test of the product prepared by the present invention.

Referring to FIG. 8, compared with $W_{18}O_{49}$/NF-1 and CoO/NF-1, $W_{18}O_{49}$/CoO/NF exhibited higher HER activity than single phase. The required overpotentials of NF (pure nickel foam), CoO/NF-1, $W_{18}O_{49}$/NF-1, $W_{18}O_{49}$/CoO/NF-1, $W_{18}O_{49}$/CoO/NF-2, $W_{18}O_{49}$/CoO/NF-3, $W_{18}O_{49}$/CoO/NF-4, $W_{18}O_{49}$/CoO/NF-5, and $W_{18}O_{49}$/CoO/NF-6 at a current density of 100 mA/cm$^2$ are 565 mV, 541 mV, 494 mV, 397 mV, 413 mV, 343 mV 374 mV, 475 mV, and 442 mV, respectively. At the same time, it can be seen that the prepared nanoneedles, nanosheets, nanosheets attached to nanowires, and flower-shaped structures attached to nanowires have good performance of the three-dimensional flower-shaped $W_{18}O_{49}$/CoO/NF-3 self-supporting electrocatalytic material.

Figure 9:
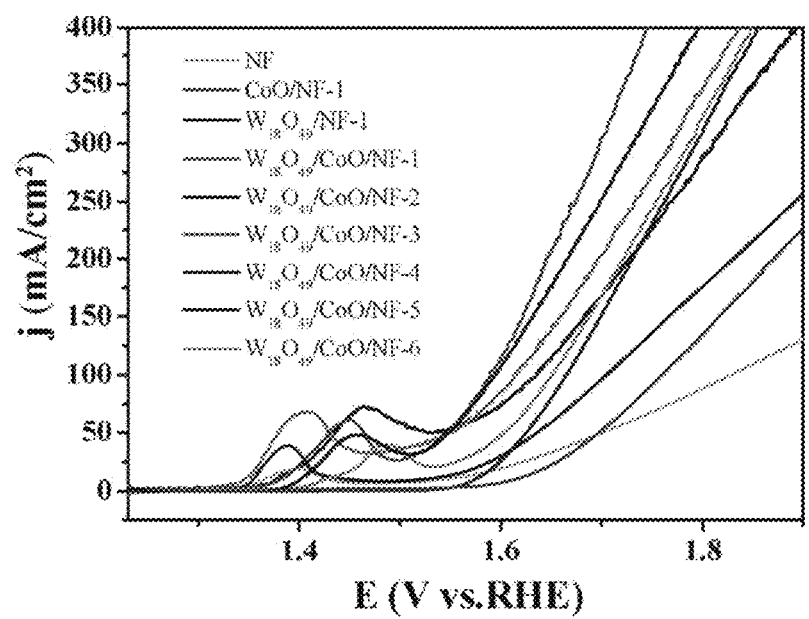
FIG. 9 shows the electrocatalytic oxygen production performance test of the product prepared by the present invention.

The NF (pure nickel foam), the electrocatalytic materials obtained in Examples 1 to 6 and Comparative Examples 1 to 2 were respectively placed in a KOH alkaline electrolyte of 1M for oxygen generation electrocatalytic testing. Referring to FIG. 9, compared with $W_{18}O_{49}$NF-1 and CoO/NF-1, $W_{18}O_{49}$/CoO/NF exhibited higher OER activity than single phase. The required over-potentials of NF (pure nickel foam), CoO/NF-1, $W_{18}O_{49}$/NF-1, $W_{18}O_{49}$/CoO/NF-1, $W_{18}O_{49}$/CoO/NF-2, $W_{18}O_{49}$/CoO/NF-3, $W_{18}O_{49}$/CoO/NF-4, $W_{18}O_{49}$/CoO/NF-5, and $W_{18}O_{49}$/CoO/NF-6 respectively at a current density of 100 mA/cm$^2$ are 630 mV, 520 mV, 470 mV, 380 mV, 360 mV, 350 mV, 410 mV, 430 mV, and 410 mV, respectively. At the same time, it can be seen that the prepared nanoneedles, nanosheets, nanosheets attached to nanowires, and flower-shaped structures attached to nanowires have good performance of the three-dimensional flower-shaped $W_{18}O_{49}$/CoO/NF-3 self-supporting electrocatalytic material.

Figure 2:
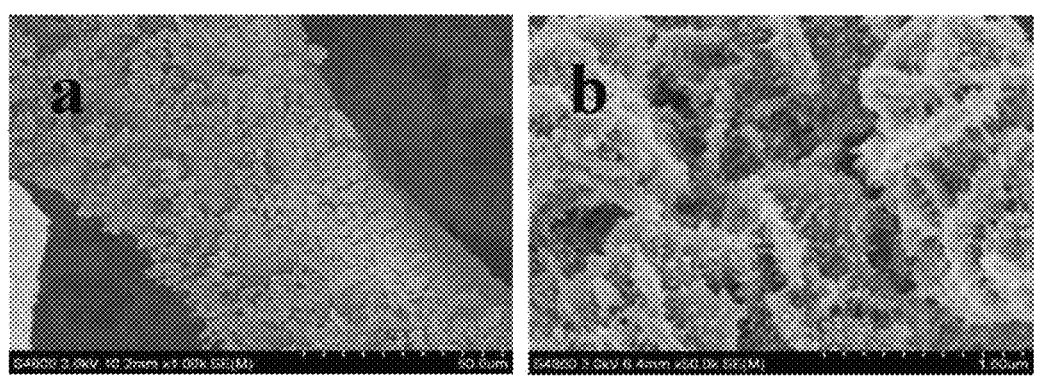
FIG. 2 shows a scanning electron microscope (SEM) image of the $W_{18}O_{49}$/CoO/NF self-supporting electrocatalytic material prepared in Example 1.
Figure 3:
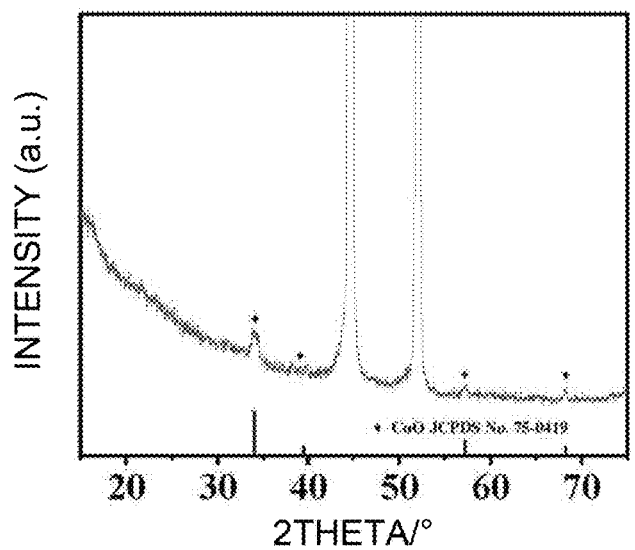
FIG. 3 shows an XRD pattern of CoO/NF prepared without adding analytical reagent tungsten hexachloride ($WCl_6$) in Comparative Example 1.
Figure 4:
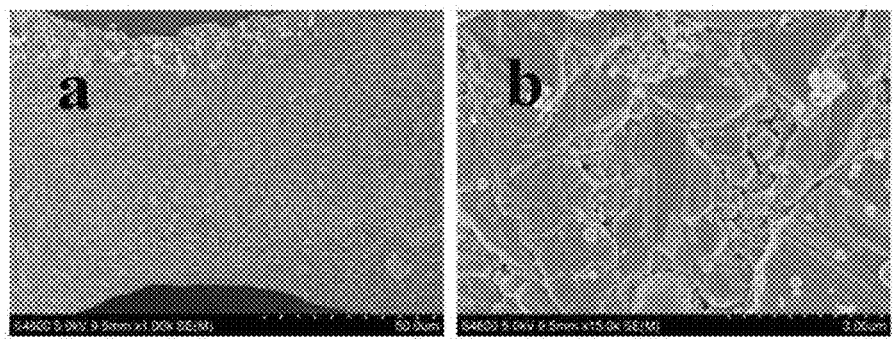
FIG. 4 shows an SEM photo of CoO/NF prepared without adding analytical reagent tungsten hexachloride ($WCl_6$) in Comparative Example 1.
Figure 5:
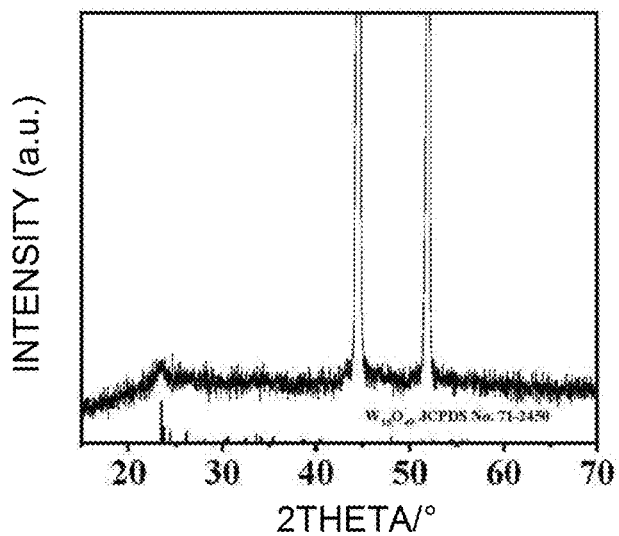
FIG. 5 shows an XRD pattern of $W_{18}O_{49}$/NF prepared without adding cobalt chloride hexahydrate ($CoCl_2·6H_2O$) in Comparative Example 2.
Figure 6:
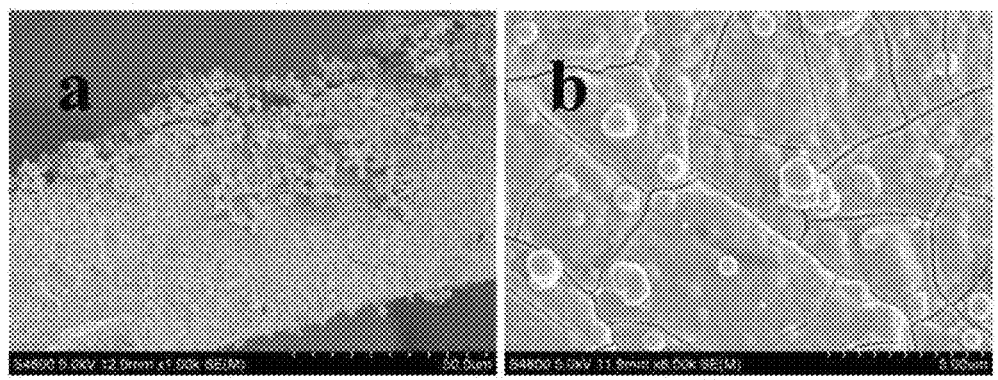
FIG. 6 shows an SEM photo of $W_{18}O_{49}$/NF prepared without adding cobalt chloride hexahydrate ($CoCl_2·6H_2O$) in Comparative Example 2.
Figure 7:
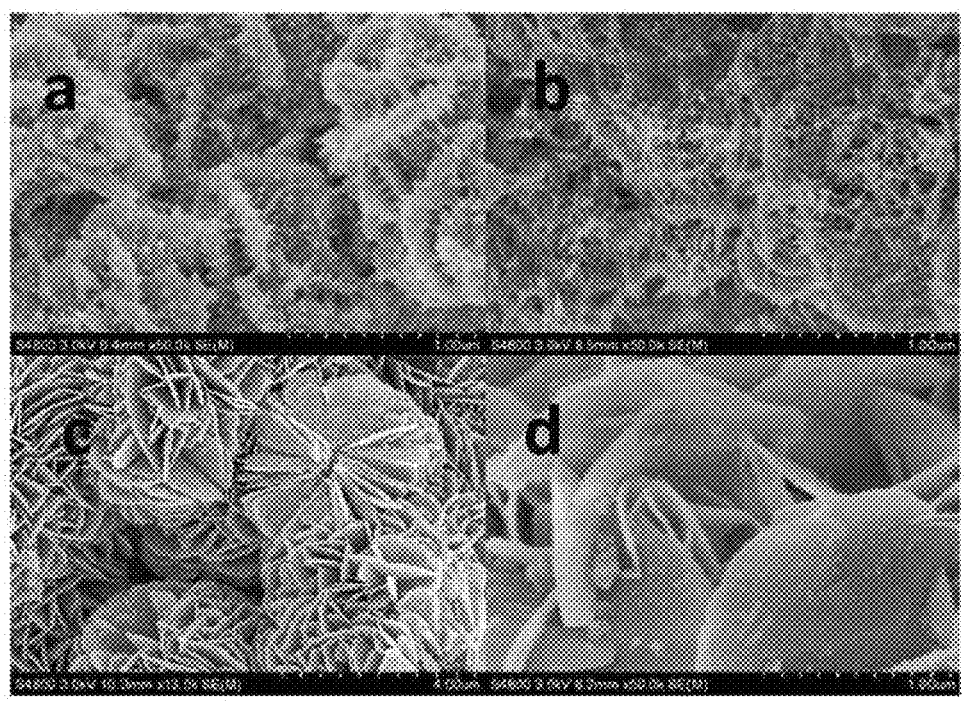
FIG. 7 shows an SEM photograph of $W_{18}O_{49}$/CoO/NF prepared by the present invention, in which (a) shows Example 1, (b) shows Example 2, (c) shows Example 3, (d) shows Example 4.
Figure 10:
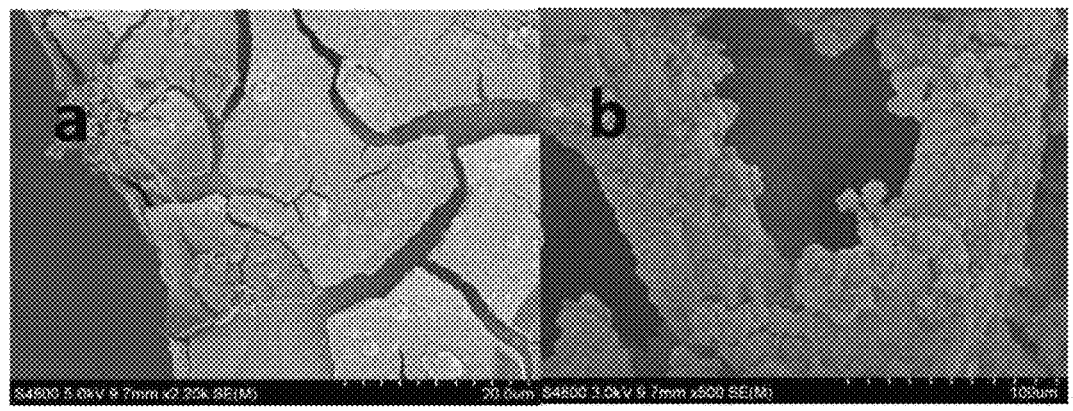
FIG. 10 shows an SEM photograph of $W_{18}O_{49}$/CoO/NF prepared by the present invention, in which (a) shows Example 5, and (b) shows Example 6.
Figure 11:
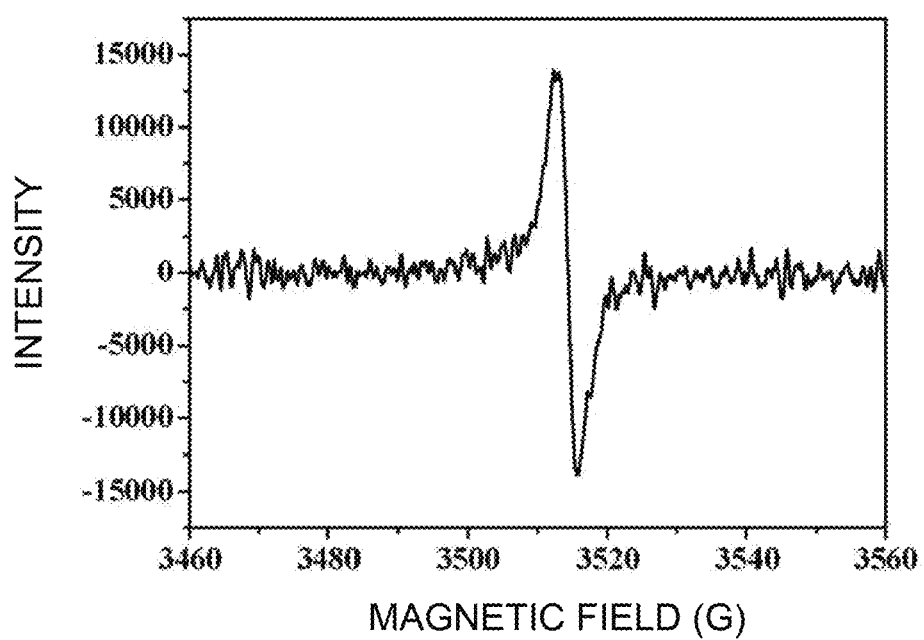
FIG. 11 shows an EPR (oxygen vacancy defect) test spectrum of the product prepared in Example 1.

FIG. 1 shows an X-ray diffraction (XRD) pattern of the $W_{18}O_{49}$/CoO/NF self-supporting electrocatalytic material prepared in Example 1, it can be seen from the figure that the diffraction peaks with 2θ values at 44.5° and 51.9° correspond to (111) and (200) crystal planes of the nickel foam (JCPDS card number 70-0989). The diffraction peaks with 2θ values at 23.47° and 48.02° correspond to the (010) crystal plane of monoclinic phase $W_{18}O_{49}$ (JCPDS Card No. 71-2450), and the diffraction peaks with 2θ values at 34.10°, 57.21°, and 68.32° correspond to the (111), (220), and (311) crystal planes of cubic CoO (JCPDS Card No. 75-0419), indicating the successful synthesis of $W_{18}O_{49}$/CoO/NF materials;

FIG. 2 shows a scanning electron microscope (SEM) image of the $W_{18}O_{49}$/CoO/NF self-supporting electrocatalytic material prepared in Example 1, it can be seen from the figure that the $W_{18}O_{49}$/CoO composite material grows densely on the foamed nickel substrate, and the product morphology is that $W_{18}O_{49}$ nanowires attach to CoO nano sheet structure, the thickness of the nanosheet is less than or equal to 100 nm, the diameter of the nanowire is about 5 to 10 nm, and the length is 100 to 200 nm; FIG. 3 shows an XRD pattern of CoO/NF prepared without adding analytical reagent tungsten hexachloride (WCl$_6$) in Comparative Example 1; it can be seen from the figure that the diffraction peaks with 2θ values at 34.10°, 39.58°, 57.21°, and 68.32° correspond to the (111), (220), and (311) crystal planes of cubic CoO (JCPDS Card No. 75-0419), indicating that the product without adding analytical reagent tungsten hexachloride (WCl$_6$) is CoO/NF;

FIG. 4 shows an SEM photo of CoO/NF prepared without adding analytical reagent tungsten hexachloride (WCl$_6$) in Comparative Example 1; it can be seen from the figure a that CoO grows densely on the nickel foam, and the figure b shows that the product has an irregular morphology;

FIG. 5 shows an XRD pattern of $W_{18}O_{49}$/NF prepared without adding cobalt chloride hexahydrate (CoCl$_2$.6H$_2$O) in Comparative Example 2; it can be seen from the figure that the diffraction peak with 2θ value at 23.47° corresponds to (010) crystal plane of foamed nickel (JCPDS card number 71-2450), indicating that the product without adding cobalt chloride hexahydrate (CoCl$_2$.6H$_2$O) is $W_{18}O_{49}$/NF;

FIG. 6 shows an SEM pattern of $W_{18}O_{49}$/NF prepared without adding cobalt chloride hexahydrate (CoCl$_2$.6H$_2$O) in Comparative Example 2, it can be seen from the figure a that $W_{18}O_{49}$ grows densely on the nickel foam, and the figure b shows that the product is convex and granular;

FIG. 10 shows a micro morphology of $W_{18}O_{49}$/CoO/NF prepared in Example 5 and Example 6. Compared with Example 1, the $W_{18}O_{49}$/CoO/NF prepared in Example 5 failed to fully grow densely on the foamed nickel, and there is a tendency to fall off. Compared with Example 2, the $W_{18}O_{49}$/CoO/NF prepared in Example 6 grows too densely on the nickel foam, resulting in uneven accumulation. This shows that smaller or larger molar ratio of the tungsten source and the cobalt source and too small or too large loading amount are not beneficial to the uniform and compact growth of $W_{18}O_{49}$/CoO/NF on the foamed nickel, and even cause the product to fall off from the foamed nickel;

FIG. 11 is a EPR test of the product prepared in Example 5, the signal peak of $W_{18}O_{49}$/CoO/NF at the position of g=2.003 was found to be strong, indicating the presence of oxygen vacancies (oxygen defects).

The invention claimed is:

1. A $W_{18}O_{49}$/CoO/NF self-supporting electrocatalytic material, comprising:
   a foamed nickel substrate; and
   a $W_{18}O_{49}$/CoO composite nano material generated on the foamed nickel substrate in situ.

2. The $W_{18}O_{49}$/CoO/NF self-supporting electrocatalytic material according to claim 1, wherein the total loading capacity of the $W_{18}O_{49}$/CoO composite nano material on the foamed nickel substrate is 0.5 to 3.5 mg/cm$^2$.

3. The $W_{18}O_{49}$/CoO/NF self-supporting electrocatalytic material according to claim 1, wherein the molar ratio of $W_{18}O_{49}$ to CoO in the $W_{18}O_{49}$/CoO composite nanomaterial is (0.005 to 0.27):1.

4. The $W_{18}O_{49}$/CoO/NF self-supporting electrocatalytic material according to claim 1, wherein the $W_{18}O_{49}$/CoO composite nano material comprises CoO nanosheets attached directly to the foamed nickel substrate, and $W_{18}O_{49}$ nanowires attached to the nanosheets.

5. The $W_{18}O_{49}$/CoO/NF self-supporting electrocatalytic material according to claim 4, wherein
   the thickness of the CoO nanosheets is less than or equal to 100 nm,
   the diameter of the $W_{18}O_{49}$ nanowires is 5 to 10 nm, and the length of the $W_{18}O_{49}$ nanowires is 100 to 200 nm.

6. A preparation method of the $W_{18}O_{49}$/CoO/NF self-supporting electrocatalytic material according to claim 1, comprising:

(1) draining a first solution containing a cobalt source into a second solution containing a tungsten source during a stirring process to obtain a third solution;
(2) putting the foamed nickel into a high-pressure reaction kettle containing the third solution reacting at 120 to 220° C. for 1 to 36 hours, and then washing and drying to obtain the foamed nickel grown with a precursor of $W_{18}O_{49}/CoO$; and
(3) calcining the foamed nickel grown with the precursor of $W_{18}O_{49}/CoO$ in a nitrogen atmosphere at 200 to 400° C. to obtain the $W_{18}O_{49}/CoO/NF$ self-supporting electrocatalytic material.

7. The preparation method according to claim 6, wherein the tungsten source is selected from at least one of ammonium paratungstate, ammonium paratungstate hexahydrate $(NH_4)_6W_7O_{24}\cdot 6H_2O$, ammonium paratungstate tetrahydrate $(NH_4)_{10}[H_2W_{12}O_{42}]\cdot 4H_2O$, metatungstic acid ammonium $(NH_4)_6H_2W_{12}O_{40}\cdot XH_2O$, tungsten isopropoxide $W(OCH(CH_3)_2)_6$, and tungsten hexachloride $WCl_6$, and
the cobalt source is selected from at least one of cobalt chloride hexahydrate $CoCl_2\cdot 6H_2O$, cobalt chloride $CoCl_2$, hexaamino cobalt chloride $[Co(NH_3)_6]Cl_3$, cobalt acetate $(CH_3CO_2)_2Co$, and cobalt acetate tetrahydrate $C_4H_6CoO_4\cdot 4H_2O$.

8. The preparation method according to claim 6, wherein solvents of the first solution containing the cobalt source and the second solution of the tungsten source are respectively selected from one of a mixed solution of isopropanol, absolute ethanol, isopropanol, and a mixed solvent of anhydrous ethanol, anhydrous ethanol and ethylene glycol, and a mixed solvent of anhydrous ethanol and glycerol, and a mixed solvent of isopropanol and ethylene glycol, and mixed solvent of isopropanol and glycerol.

9. The preparation method according to claim 6, wherein the molar ratio of the tungsten source to the cobalt source is (0.05 to 5):1.

10. The preparation method according to claim 9, wherein the molar ratio of the tungsten source to the cobalt source is (1 to 3.5):1.

11. The preparation method according to claim 6, wherein the volume filling ratio of the high-pressure reaction kettle containing the third solution is 20 to 70%.

12. The preparation method according to claim 6, wherein the calcination time is 1 to 3 hours and the heating rate of the calcination is 2 to 5° C./min.

\* \* \* \* \*